United States Patent [19]

Mukaida

[11] Patent Number: 5,508,808
[45] Date of Patent: Apr. 16, 1996

[54] DEVELOPMENT SENSOR APPARATUS FOR MONITORING THE PROGRESSION OF DEVELOPMENT OF AN OPTICAL DISK MASTER

[75] Inventor: Masaru Mukaida, Tokyo, Japan

[73] Assignee: NEC Corporation, Tokyo, Japan

[21] Appl. No.: 337,526

[22] Filed: Nov. 8, 1994

[30] Foreign Application Priority Data

Nov. 22, 1993 [JP] Japan .................................. 5-315887

[51] Int. Cl.$^6$ ............................................. G01B 11/00
[52] U.S. Cl. ............................................. 356/372; 356/354
[58] Field of Search ............................ 356/372, 237, 356/378, 446, 354, 355, 356, 357, 374; 250/237 G; 369/44.14, 44.37, 44.24, 109, 110

[56] References Cited

U.S. PATENT DOCUMENTS

| | | | |
|---|---|---|---|
| 4,303,341 | 12/1981 | Kleinknecht et al. | 356/355 |
| 4,330,213 | 5/1982 | Kleinknecht et al. | 356/355 |
| 4,601,576 | 7/1986 | Galbraith | 356/237 |
| 4,615,620 | 10/1986 | Noguchi et al. | 356/355 |

FOREIGN PATENT DOCUMENTS 59-171957 9/1984 Japan .
60-212832 10/1985 Japan .
1-298356 12/1989 Japan .

OTHER PUBLICATIONS

Yoshihiro Okino et al., "Mastering Process and Facilities Using Laser Beam for Optical Discs", *National Technical Report*, vol. 29, No. 5, Oct. 1983, pp. 752–764.

*Primary Examiner*—Hoa Q. Pham
*Attorney, Agent, or Firm*—Young & Thompson

[57] ABSTRACT

A development sensor apparatus includes an optical system, a 0th-order light detection unit, a 1st-order light detection unit, a diffracted light ratio calculating unit, and an ellipsoidal mirror. The optical system radiates a laser beam to a predetermined development monitor point on a pattern surface of a master having an exposed pattern. The 0th-order light detection unit receives a 0th-order diffracted light component from the development monitor point. The 1st-order light detection unit receives reflected light of a 1st-order diffracted light component from the development monitor point. The diffracted light ratio calculating unit calculates a ratio of diffracted light amounts of the 0th- and 1st-order diffracted light components based on detection signals of the 0th- and 1st-order light detection units and outputs a development monitor signal. The ellipsoidal mirror is provided on an optical path of the 1st-order diffracted light component from the development monitor point and reflects the 1st-order diffracted light component from the development monitor point toward the 1st-order light detection unit.

2 Claims, 3 Drawing Sheets

DEVELOPMENT SENSOR APPARATUS FOR MONITORING THE PROGRESSION OF DEVELOPMENT OF AN OPTICAL DISK MASTER

BACKGROUND OF THE INVENTION

1. Field of the Invention

The present invention relates to a development sensor apparatus and, more particularly, to a development sensor apparatus for obtaining the progression of development of an optical disk master.

2. Description of the Related Art

According to a conventional development sensor apparatus, as shown in, e.g., Japanese Patent Laid-Open Nos. 59-171957, 60-212832, and 1-298356, and "National Technical Report", Vol. 29, No. 5, p. 106, Oct. 1983, 0th- and 1st-order diffracted light components obtained by radiating a laser beam on the pattern surface of a photoresist substrate under development are directly received by optical detection units, the positions of which relative to a radiation point on the pattern surface are fixed, and the ratio of these diffracted light components is calculated from detection signals of the respective diffracted light components.

FIG. 3 shows the main part of a conventional development sensor apparatus.

Referring to FIG. 3, a monitoring laser beam L incident on the lower surface of a master 51 during development is diffracted by a photoresist pattern formed on the master 51 in accordance with the progress of development. 0th- and 1st-order diffracted light components L0 and L1 are respectively received by optical sensors 52 and 53.

A diffracted light ratio calculating unit 60 calculates the ratio of the diffracted light from a detection signal a output from the optical sensor 52 upon reception of the 0th-order diffracted light component L0 and a sensor signal b output from the optical sensor 53 upon reception of the 1st-order diffracted light component L1, and outputs a development monitor signal c. Thus, the progression of development of the optical disk master can be detected outside the developing unit. In this case, the developing unit stops development when the diffracted light ratio reaches a desired value.

The direction of the optical axis of the 1st-order diffracted light component is changed by the flowed state of the developing agent flowing on the photoresist substrate or the eccentricity of the photoresist substrate from a substrate rotating unit obtained when the photoresist substrate is installed on the substrate rotating unit. However, in the conventional case, since the 1st-order diffracted light component is directly received by the optical sensor 53, the position of which relative to the radiation point of the monitoring laser beam on the photoresist substrate is fixed, the light-receiving position on the light-receiving surface of the optical sensor 53 undesirably changes. Thus, due to variations in light-receiving sensitivity of the optical sensor 53 within the light-receiving surface, the progression of development cannot be accurately monitored.

In this case, when the light-receiving sensitivity of the optical sensor 53 varies by about several %, it causes variations in level of the development monitor signal c, thereby causing variations in the shape of the formed pattern.

Furthermore, when patterns formed on the photoresist substrate have different pitches, the 1st-order diffracted light components have different diffraction angles. Thus, a cumbersome and skilled operation is required for position adjustment and the like of the optical sensor 53 that receives the 1st-order diffracted light components.

SUMMARY OF THE INVENTION

It is an object of the present invention to provide a development sensor apparatus capable of monitoring the progression of development precisely.

It is another object of the present invention to provide a development sensor apparatus capable of receiving 1st-order diffracted light components always under the same conditions even when the optical path of the 1st-order diffracted light component is changed.

In order to achieve the above objects, according to the present invention, there is provided a development sensor apparatus comprising optical means for radiating a laser beam to a predetermined development monitor point on a pattern surface of a master having an exposed pattern, 0th-order light detection means for receiving a 0th-order diffracted light component from the development monitor point, 1st-order light detection means for receiving reflected light of a 1st-order diffracted light component from the development monitor point, arithmetic means for calculating a ratio of diffracted light amounts of the 0th- and 1st-order diffracted light components based on detection signals of the 0th- and 1st-order light detection means and outputting a development monitor signal, and an ellipsoidal mirror, provided on an optical path of the 1st-order diffracted light component from the development monitor point, for reflecting the 1st-order diffracted light component from the development monitor point toward the 1st-order light detection means.

DESCRIPTION OF THE PREFERRED EMBODIMENT

An embodiment of the present invention will be described with reference to FIG. 1.

Figure 1:
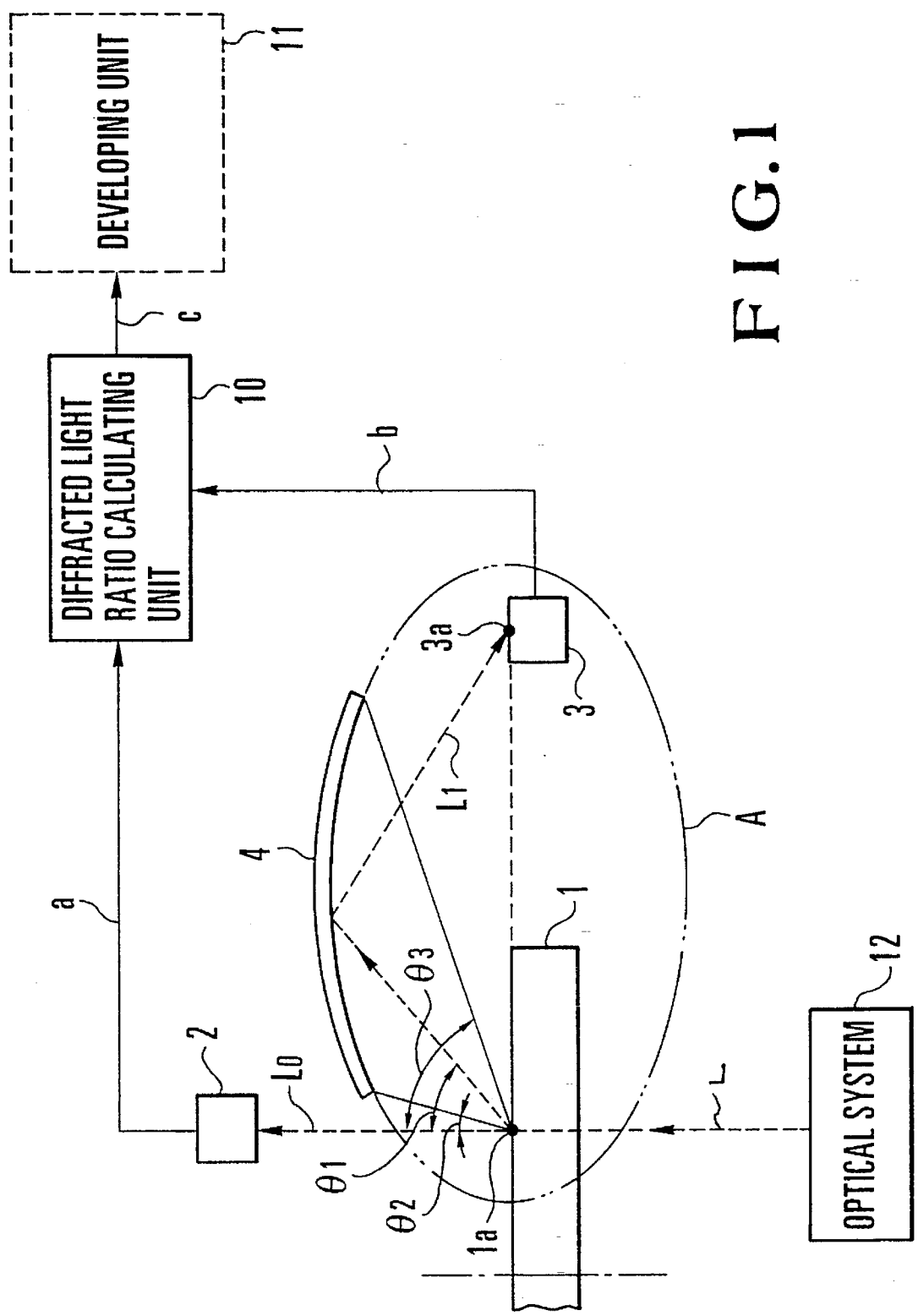
FIG. 1 is a schematic diagram showing a development sensor apparatus according to an embodiment of the present invention.
Figure 2:
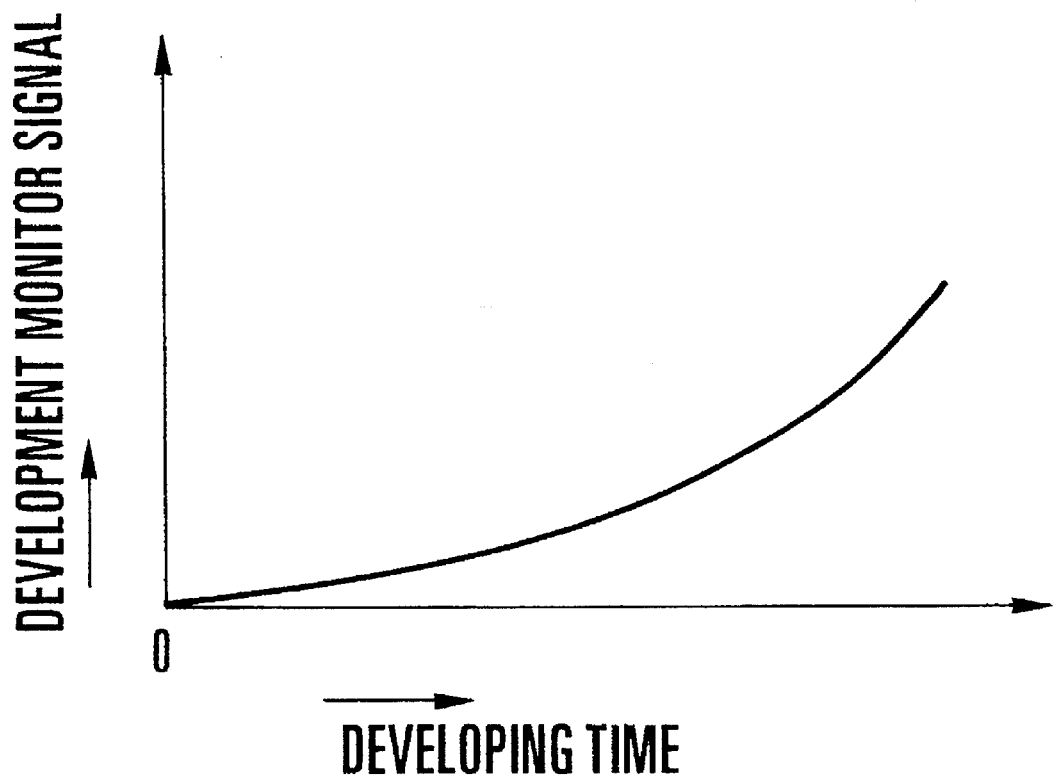
FIG. 2 is a chart showing the relationship between a development time and a development monitor signal.
Figure 3:
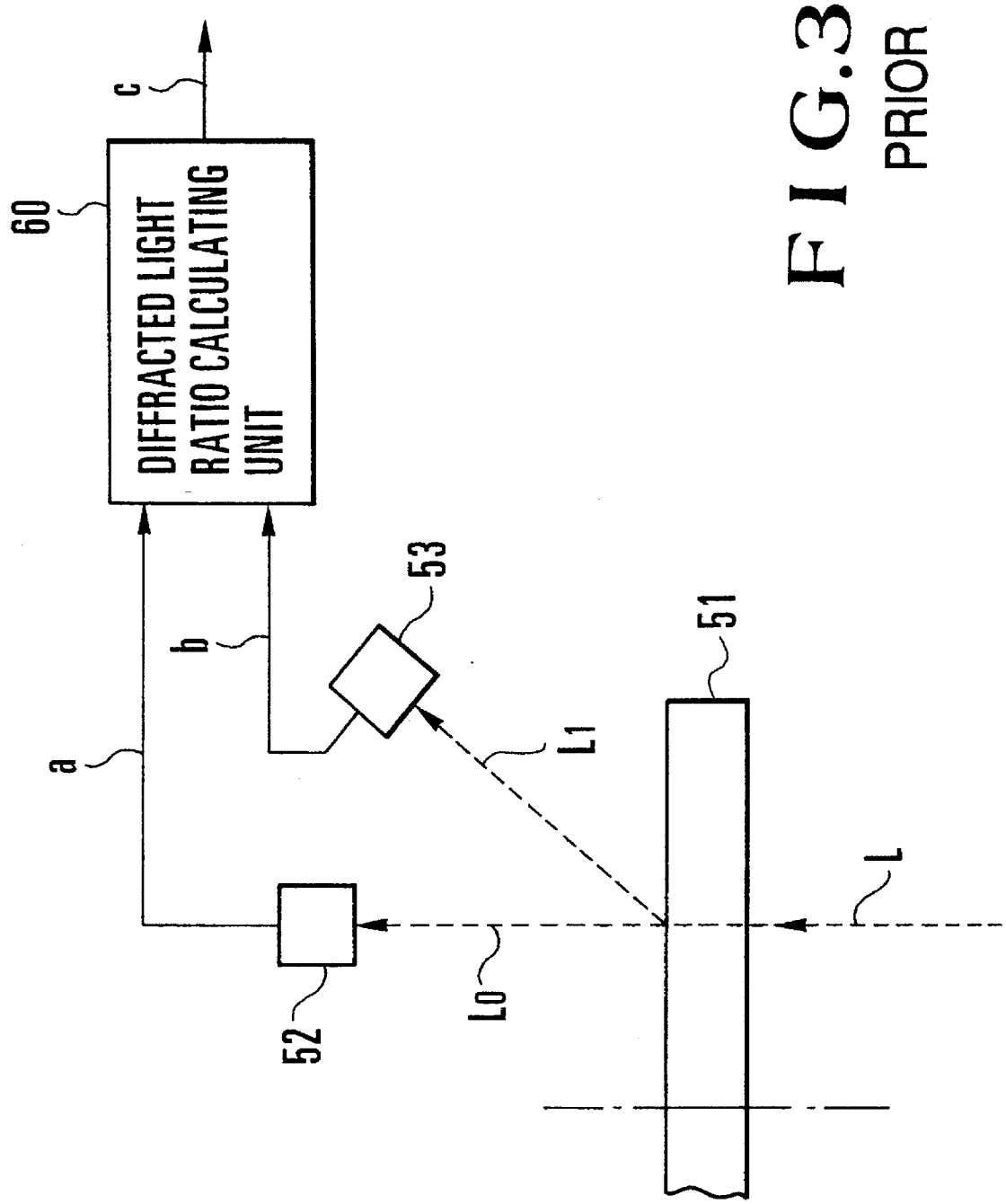
FIG. 3 is a schematic diagram showing a conventional development sensor apparatus.

The embodiment shown in FIG. 1 has a 0th-order light detection unit 2, a 1st-order light detection unit 3, a diffracted light ratio calculating unit 10, and an ellipsoidal mirror 4. The 0th-order light detection unit 2 receives 0th-order diffracted light component L0, obtained by radiating a monitoring laser beam L to a development monitor point 1a on the pattern surface of a master 1 having an exposed pattern from the lower surface thereof, and outputs a detection signal a of the diffracted light component. The 1st-order light detection unit 3 receives reflected light of a 1st-order diffracted light component L1, obtained by radiating the monitoring laser beam L to the development monitor point 1a on the master 1 from the lower surface thereof, and outputs a detection signal b of the diffracted light component. The diffracted light ratio calculating unit 10 calculates the ratio of the diffracted light components from the detection signals a and b of the diffracted light components and outputs a development monitor signal c.

The ellipsoidal mirror 4 has an ellipsoid A having the development monitor point 1a and a detection point 3a of the 1st-order diffracted light component L1 corresponding to the light-receiving surface of the 1st-order light detection unit 3 as the focal points, and a size to cover the variations in diffraction angle of the 1st-order diffracted light component L1 so that only the 1st-order diffracted light component L1 is reflected.

The 0th-order light detection unit 2 is arranged on an extended line of the optical path of the monitoring laser beam L, i.e., is arranged above the development monitor point 1a. The 1st-order light detection unit 3 is arranged near the master 1 to be the same level as that of the surface of the master 1. The detection units 2 and 3 are constituted by optical sensors. The development monitor point 1a is a stationary sample point set at a predetermined position to monitor the developed state. The ellipsoidal mirror 4 having a predetermined shape is stationarily set by setting the position of the detection point 3a. Reference numeral 11 denotes a developing unit 11 for performing development based on the development monitor signal c sent from the diffracted light ratio calculating unit 10; and 12, an optical system for radiating the laser beam.

The monitoring laser beam L is radiated to the development monitor point 1a on the master 1 from the lower surface of the master 1, and is diffracted by the photoresist pattern formed by development.

Of the diffracted light components emerging from the development monitor point 1a located on one focal point of the ellipsoidal mirror 4, the 0th-order diffracted light component L0 is received by the 0th-order light detection unit 2, and the 1st-order diffracted light component L1 having a predetermined diffraction angle is reflected by the ellipsoidal mirror 4 and received by the detection point 3a for the 1st-order diffracted light component L1 on the surface of the 1st-order light detection unit 3 located on the other focal point of the ellipsoidal mirror 4.

The diffracted light ratio calculating unit 10 is constituted by a divider which executes a division b/a in accordance with the detection signal a sent from the 0th-order light detection unit 2 and the detection signal b sent from the 1st-order light detection unit 3 and outputs the result as the development monitor signal c. Hence, the development monitor signal c indicates the ratio of the 1st-order diffracted light component to the 0th-order diffracted light component and is increased as the pattern is formed by development. The developing unit 11 that has received this development monitor signal c monitors the progression of development from the input development monitor signal c, and ends development when the development monitor signal c reaches the above ratio with which a desired pattern shape can be obtained.

A practical example of FIG. 1 will be disclosed. For example, when the wavelength of the monitoring laser beam L is 632.8 [nm] and the distance between the development monitor point 1a and the detection point 3a of the 1st-order diffracted light component is 400 [mm], first of all, the ellipsoidal mirror 4 having a 250-[mm] major axis and a 150-[mm] minor axis is set such that its focal points are located on the development monitor point 1a and the detection point 3a of the 1st-order diffracted light component.

At this time, assume that the ellipsoidal mirror 4 is set such that an angle θ82 defined by a straight line connecting one end point of the ellipsoidal mirror 4 and the development monitor point 1a and the optical path of the monitoring laser beam L and an angle θ3 defined by a straight line connecting the other end point of the ellipsoidal mirror 4 and the development monitor point 1a and the optical path of the 0th-order diffracted light component L0 are 20° and 40°, respectively. Therefore, the ellipsoid of the ellipsoidal mirror has a range of 20° to 40° with respect to an optical path of the 0th-order diffracted light component from the development monitor point 1a. Then, in a master for forming a pattern to have a pitch of 0.8 to 1.6 [μm], a diffraction angle θ1 of the 1st-order diffracted light component L1 is 23° to 39° and the diffraction angles of diffracted light components of second and higher orders are 50° or more. Thus, only the 1st-order diffracted light component L1 can always be reflected toward the detection point 3a on the surface of the 1st-order light detection unit 3 to be received by the 1st-order light detection unit 3.

Even if the patten has a pitch of 0.8 [μm] or less, development can be monitored by using an ellipsoidal mirror which is set in the same manner as described above.

The present invention has the above arrangement and functions as described above. According to the present invention, of the diffracted light components generated by the photoresist pattern, the 1st-order diffracted light component, the direction of the optical path of which is changed by the flowed state of the developing agent flowing on the photoresist substrate or the eccentricity of the photoresist substrate from a substrate rotating unit obtained when the photoresist substrate is mounted on the substrate rotating unit, is reflected by the ellipsoidal mirror having the development monitor point and the detection point of the 1st-order diffracted light component as the focal points. Thus, the 1st-order diffracted light component can always be received by the detection point fixed on the 1st-order light detection unit. For this reason, the 1st-order diffracted light component can be received within a very small area on the 1st-order light detection unit. Even when the light-receiving sensitivity of the sensor surface of the 1st-order light detection unit varies or the output direction of the 1st-order diffracted light changes, such a change can be effectively allowed, the progression of development is correctly monitored. Furthermore, even when patterns formed on the photoresist substrate as the master have different pitches, the position adjustment and the like of the optical sensor that receives the 1st-order diffracted light component need not be performed in accordance with the pitch. As a result, an excellent development sensor apparatus which does not need time and labor conventionally needed in position adjustment of an optical sensor can be provided.

What is claimed is:

1. A development sensor apparatus comprising:

optical means for radiating a laser beam to a predetermined development monitor point on a pattern surface of a master having an exposed pattern;

0th-order light detection means for receiving a 0th-order diffracted light component from said development monitor point;

1st-order light detection means for receiving reflected light of a 1st-order diffracted light component from said development monitor point comprising a light receiving surface level with said pattern surface of said master;

arithmetic means for calculating a ratio of diffracted light amounts of the 0th- and 1st-order diffracted light components based on detection signals of said 0th- and 1st-order light detection means and outputting a development monitor signal; and an ellipsoidal mirror, provided on an optical path of the 1st-order diffracted light component from said development monitor point, for reflecting the 1st-order diffracted light component from said development monitor point toward said 1st-order light detection means, said ellipsoidal mirror including an ellipsoid having said development monitor point and a detection point on said light receiving surface of said 1st-order light detection means as focal points, said ellipsoid having a range of 20° to 40° with respect to an optical path of the 0th-order diffracted light component from said development monitor point.

2. An apparatus according to claim 1, wherein said arithmetic means is constituted by a divider for calculating a ratio of a light amount of the 1st-order diffracted light component to a light amount of the 0th-order diffracted light component.

* * * * *